United States Patent [19]
Farino

[11] Patent Number: 6,074,009
[45] Date of Patent: Jun. 13, 2000

[54] VEHICLE THEFT PREVENTION DEVICE

[76] Inventor: Joseph Farino, 19 Caryn Pl., Fairfield, N.J. 07004

[21] Appl. No.: 09/249,393

[22] Filed: Feb. 12, 1999

Related U.S. Application Data

[63] Continuation-in-part of application No. 08/899,730, Jul. 24, 1997, abandoned.

[51] Int. Cl.[7] ....................................................... B60N 2/02
[52] U.S. Cl. ........................ 297/378.14; 70/261; 297/341
[58] Field of Search ............................ 297/217.3, 378.14, 297/378.12, 341; 70/261, 211, 212, 237; 296/65.16

[56] References Cited

U.S. PATENT DOCUMENTS

| | | | |
|---|---|---|---|
| 4,451,887 | 5/1984 | Harada et al. | 296/65.16 X |
| 4,523,136 | 6/1985 | Dudeck et al. | 296/65.16 X |
| 4,669,780 | 6/1987 | Sakakibara et al. | 296/65.16 X |
| 4,812,838 | 3/1989 | Tashiro et al. | 296/65.16 X |
| 4,922,426 | 5/1990 | Obara et al. | 296/65.16 X |
| 4,967,178 | 10/1990 | Saito et al. | 296/65.16 X |
| 5,187,665 | 2/1993 | Futami et al. | 296/65.16 X |
| 5,529,372 | 6/1996 | Cohen | 297/341 X |

*Primary Examiner*—Peter M. Cuomo
*Assistant Examiner*—Stephen Vu
*Attorney, Agent, or Firm*—Arnold D. Litt, Esq.

[57] ABSTRACT

A theft prevention device for vehicles employing a seat patterning system to automatically control the position of a vehicle seat is disclosed. The theft prevention device includes a security controller adapted for integration with the seat patterning system such that the security controller instructs the seat patterning system to move the seat between an original position and a forward position with the seat member and lumbar support moved forward to thereby prevent a thief from accessing the passenger compartment of the vehicle. The theft prevention device also includes an actuating switch communicating with the security controller to send the security controller a message to instruct the seat patterning system to selectively move the vehicle seat between the original position and the forward position.

The actuating switch comprises in part a power switch which the owner or user of the vehicle can turn on or off, thereby connecting or disconnecting, as the case may be, the actuating switch from the electrical power system circuit of the vehicle.

10 Claims, 14 Drawing Sheets

VEHICLE THEFT PREVENTION DEVICE

CROSS-REFERENCE TO RELATED APPLICATION

This application relates to the inventor's own U.S. Pat. No. 5,644,937, issued on Jul. 8, 1997, which is incorporated herein by reference. This Application is a continuation in part of Ser. No. 08/899,730 filed Jul. 24, 1997 which has been abandoned.

BACKGROUND OF THE INVENTION

1. Field of the Invention

The invention relates to a vehicle theft prevention device. More particularly, the invention relates a vehicle theft prevention device which locks the vehicle seat, and/or the rear lumbar support member, in a forward position to prevent access to the seating area by a would-be thief. As a result, the would-be thief is denied access to the front instrument panel and dashboard, and is not able to drive the car, open the glove compartment, remove the stereo, or steal other objects which might interest the thief.

2. Background of the Invention

Car theft has become a major problem throughout the United States, and many products have been developed to prevent and deter would-be thieves from stealing automobiles and the goods stored therein.

The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park".

While prior devices are generally effective in preventing a thief from operating the automobile once he or she has entered the vehicle, they often fail to provide the deterrent necessary to discourage the thief from damaging the automobile when he or she attempts to enter the automobile. That is, these products do not sufficiently signal the thief that any attempt to steal the automobile will be futile. As such, thieves often break windows and destroy car locks, only to find they cannot operate the automobile due to the theft prevention device. However, these devices do not limit the thieves' access to the seating area and a thief is, therefore, provided with a work space in which he or she may steal objects stored within or on the front instrument panel and dashboard.

In addition, these products fail to prevent a thief from stealing goods stored within the automobile, for example, air bags, a stereo system or any goods stored within the glove box. Since they are merely secured to the functional components of the automobile, the prior theft prevention devices leave the passenger compartment fully open. As a result, a thief is provided with full access to sit in the seat of the passenger compartment where he or she may steal air bags, stereo equipment, or goods stored in the glove box, despite the fact that the automobile cannot be stolen. The term "passenger compartment" is used throughout the remainder of this disclosure and should be understood to refer to the space between the front instrument panel and dashboard and the front seats of the vehicle. As such, the "passenger compartment" includes, but is not limited to, the seating area, the driver seat, the passenger seat, leg space, the glove compartment, the stereo console and the steering column.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with access to the air bags, stereo equipment and other goods stored in the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore provided with a work area in which he or she is provided full access to the front instrument panel and dashboard of the vehicle.

In U.S. Pat. No. 5,529,372 issued Jun. 25, 1996 to Morris Cohen, there is taught a security system for an automobile having a motorized seat. The seat is equipped with a set of longitudinal guide channels and rollers which move in the channels to move the seat forwardly or rearwardly. A motor drive system is connected to the seat. A CPU memory stores instructions for operation of the motor drive to vary the position of the seat with respect to the rails. In operation when a thief breaks into a vehicle, the seat and lumbar move excessively forwardly, so that a person cannot operate the steering wheel or control pedals of the vehicle. Unfortunately, a thief would have time during the period from the break in until the seat and lumbar members come to rest, to jam a wedge between the seat rollers and rail guides to prevent further movement and thereby defeat the security system. Moreover, to utilize the invention claimed by the patentee, the owner or user of the automobile must retrofit the rails on which the automobile seat rides forwardly and rearwardly, by extending the rails so that the desired security position of the seat can be obtained in the security mode contemplated by the Patentee. In addition, additional position sensors must be installed. Furthermore, clock devices must be installed to synchronize the movement of the seat when the thief breaks into the vehicle. The required retrofitting costs of the existing vehicle are substantial and time consuming, requiring substantial restructuring of the vehicle. Needless to say, this is not acceptable from the perspective of the owner; of the vehicle.

As a review of the prior art reveals, a need continues to exist for a cost effective theft prevention device which prevents theft of the automobile, substantially limits access to the passenger compartment of the automobile, and provides a visible deterrent to theft. The present invention provides such a device.

SUMMARY OF THE INVENTION

It is, therefore, an object of the present invention to provide a theft prevention device for vehicles employing a seat patterning system to automatically control the position of a vehicle seat, wherein the vehicle seat includes a seat member and a lumbar support member. The theft prevention device includes a security controller adapted for integration with the seat patterning system such that the security controller instructs the seat patterning system to move the seat between an original position and a forward position with the sect member and lumbar support moved forward to thereby prevent a thief from accessing the passenger compartment of the vehicle. The theft prevention device also includes an actuating switch communicating with the security controller to send the security controller a message to instruct the seat patterning system to selectively move the vehicle seat between the original position and the forward position.

It is another object of the present invention to provide a theft prevention device wherein the security controller is integrally formed with the seat patterning system.

It is also an object of the present invention to provide a theft prevention device wherein the actuating switch includes a security coded keypad.

It is a further object of the present invention to provide a theft prevention device wherein the actuating switch is a receiver that is triggered by a remote control.

It is another object of the present invention to provide a theft prevention device wherein the actuating switch is triggered by a key.

It is another object of the present invention to provide a theft prevention device wherein the actuating switch when triggered sends a message to the security controller which in turn instructs the seat patterning system to move the vehicle seat to a forward security position, at which time the actuating switch becomes disconnected from the electric power system circuitry of the vehicle thereby preventing a thief from overriding the theft prevention device and re-establishing the normal positioning of the seat.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
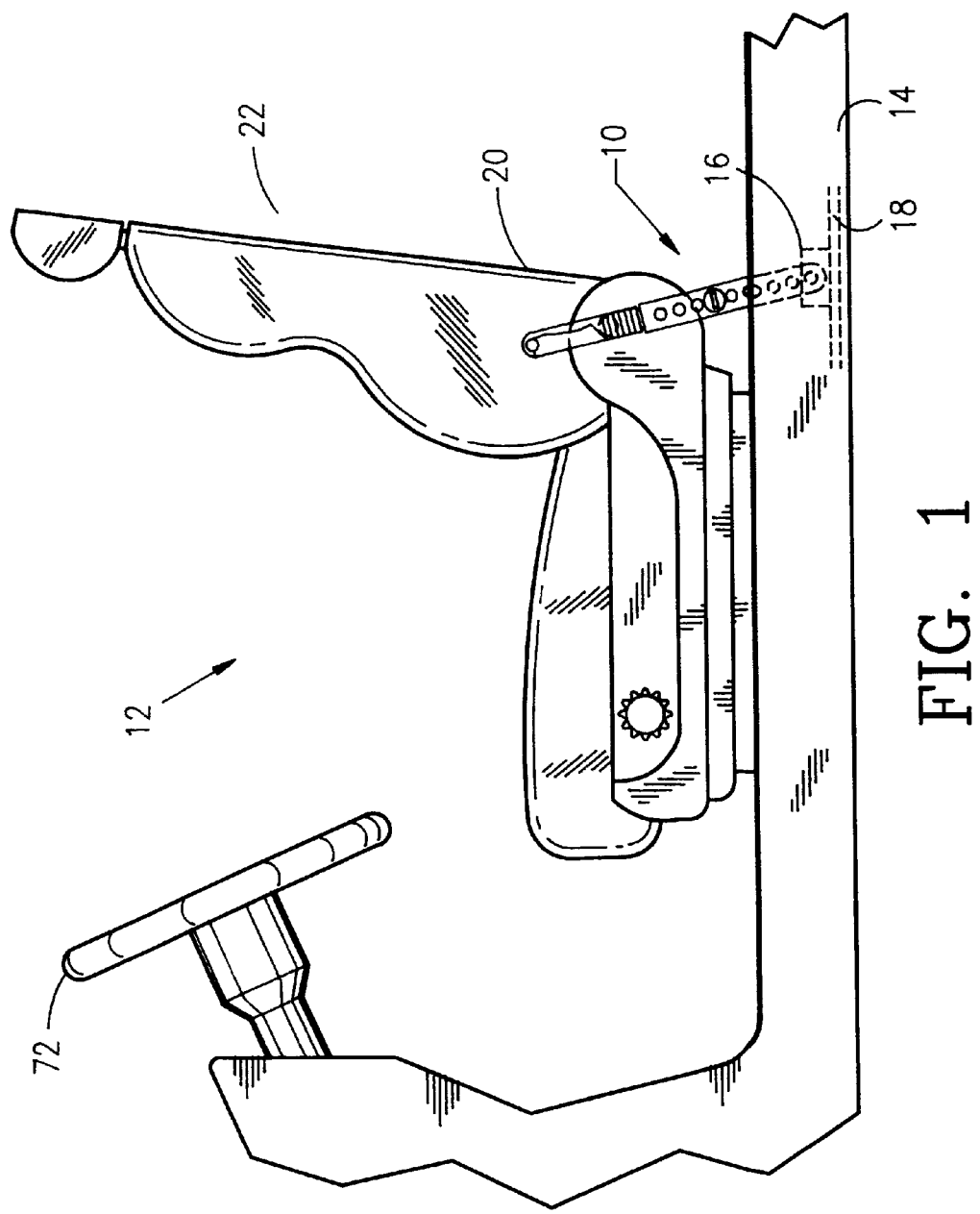
FIG. 1 is a side view of an vehicle seat including a first embodiment of the present theft prevention seat.

With reference to FIG. 1, the present theft prevention device 10 is shown mounted within a vehicle 12. The term "vehicle" is used throughout this disclosure and is intended to include cars, automobiles, trucks and other transportation devices that may incorporate the present invention in a useful manner. The theft prevention device 10 is mounted between the vehicle frame 14, specifically, the pivoting bolt 16 of the rocker panel 18, and the lumbar support member 20 of the vehicle seat 22. While the vehicle seat discussed below is provided with a lumbar support member that is freely pivoted relative to the seat member, the theft prevention device may be utilized with virtually any vehicle seat regardless of the lumbar support member's ability to pivot relative to the seat member. In fact, the theft prevention device is designed such that it may be used with virtually any vehicle, without departing from the spirit of the present invention.

Figure 2:
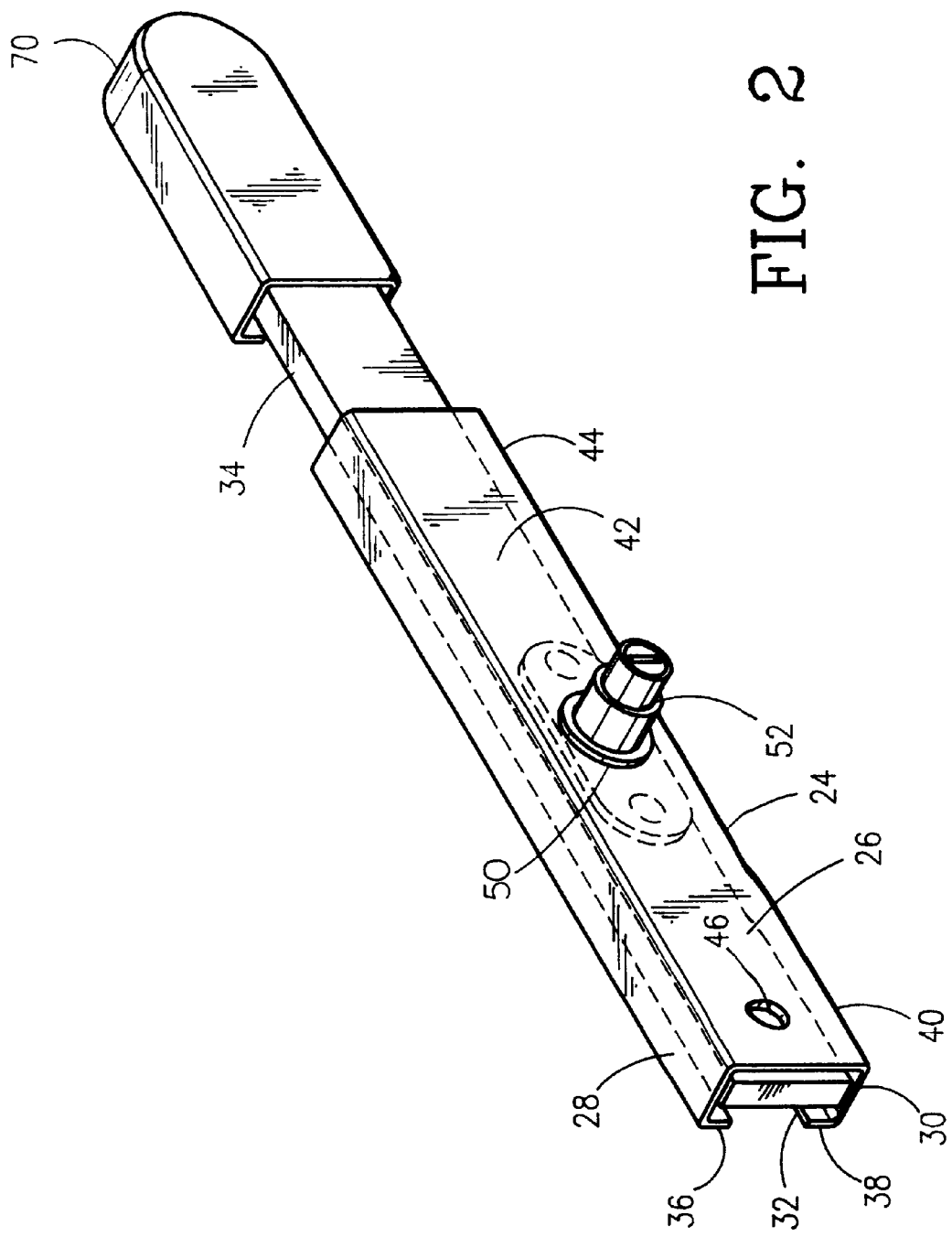
FIG. 2 is a perspective view of the present theft prevention device.
Figure 3:
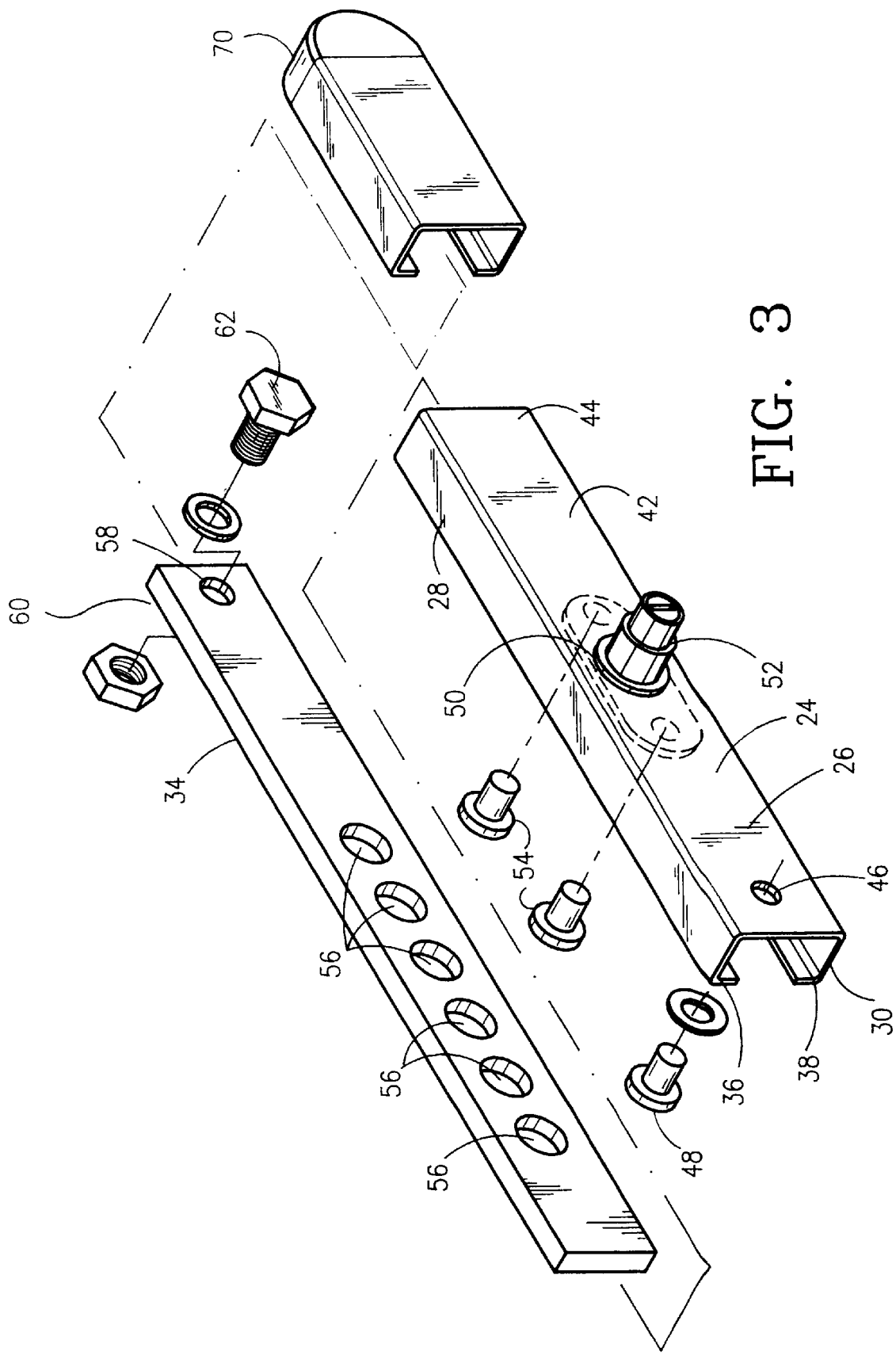
FIG. 3 is an exploded view of the present theft prevention device.

The theft prevention device 10 itself is shown in greater detail in FIGS. 2 and 3. The device 10 includes a first U-shaped bar 24 adapted for attachment to the pivoting bolt 16 of the vehicle's rocker panel 18. The U-shaped bar 24 includes a flat central member 26 having a first arm 28 and a second arm 30 extending therefrom to create a recess 32 in which the second bar 34 may travel. The first arm 28 includes a distal end 36 that is curved inwardly toward the open end of the U-shaped bar 24 and the second arm 36 includes a distal end 38 that is similarly curved inwardly toward the open end of the U-shaped bar 24. The curved distal end 36 of the first arm 28 and the curved distal end 38 of the second arm 30 extend inward a sufficient distance to maintain the second bar 34 within the recess 32. The recess 32 is sized to maintain the second arm 30 therein, but permit the second arm 30 to freely slide within the recess 32. As a result, the recess 32 is designed to be only slightly larger than the second arm 30.

Figure 9:
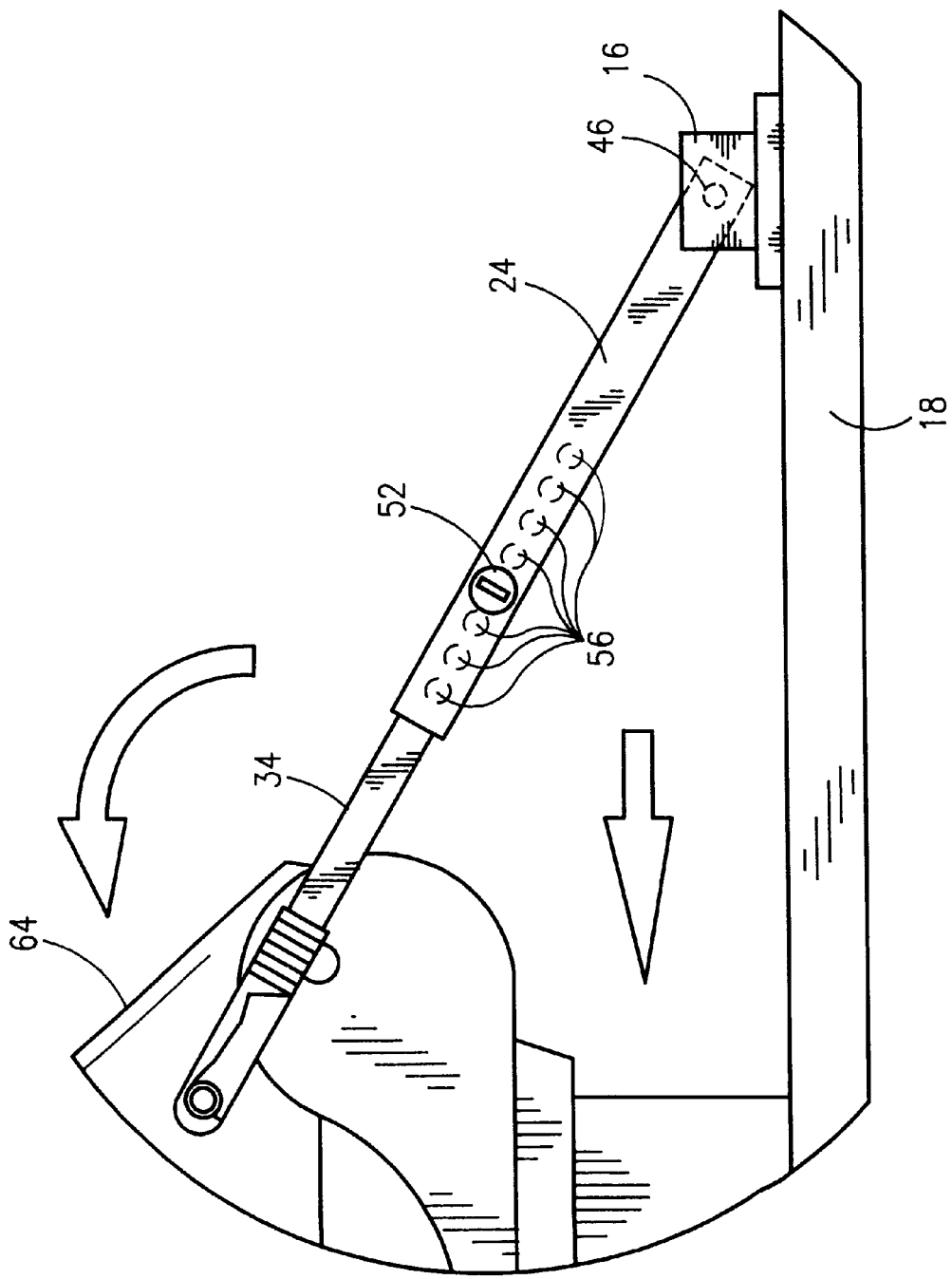
FIG. 9 is a side view showing the attachment of the theft prevention device to the pivoting bolt of the rocker panel.

The central member 26 includes a first end 40, a central portion 42 and a second end 44. The first end 40 is provided with a hole 46 sized to permit a bolt 48 to pivotally secure the first end 40 of the U-shaped bar 24 to the pivoting bolt 16 of the vehicle's rocker panel 18 (see FIG. 9). In this way the U-shaped bar 24 may pivot in a manner that will become apparent as the device is further explained.

The central member 26 is also provided with an opening 50 at its central portion 42 for supporting a locking member 52 thereon. The locking member 52 is secured to the U-shaped bar by a pair of bolts 54. The locking member 52 is positioned on the U-shaped bar 24 such that it may selectively engage openings 56 on the second bar 34 to lock the second bar 34 relative to the U-shaped bar 24 in a manner that will be discussed in greater detail below.

Figure 11A:
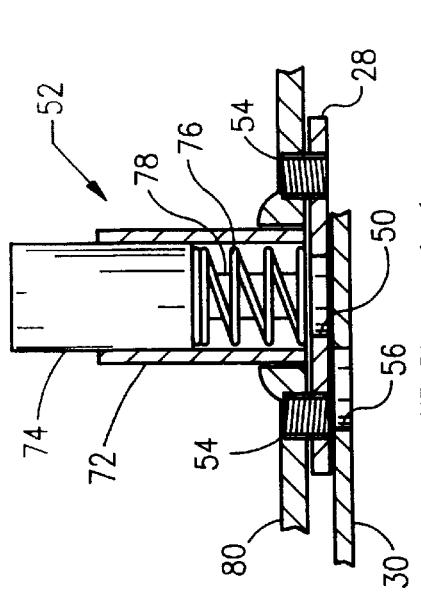
FIG. 11a is a cross-sectional view of the locking member in its unlocked position.
Figure 11B:
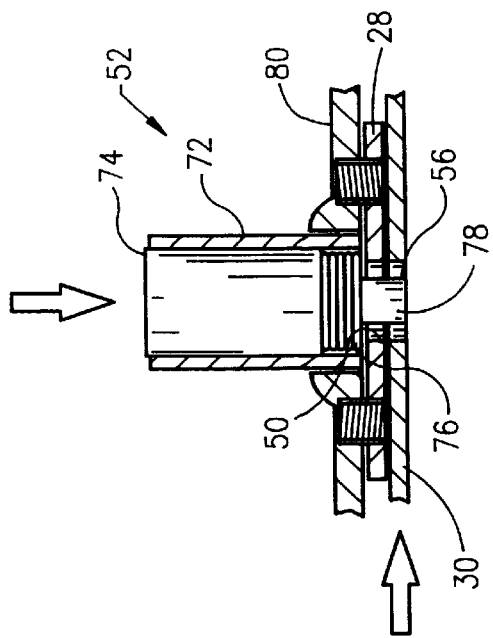
FIG. 11b is a cross-sectional view of the locking member in its locked position.

As shown in FIGS. 11a and 11b, the locking member 52 is a conventional spring lock. The locking member 52 is provided with a sleeve 72 in which a locking cylinder 74 is positioned. The locking cylinder 74 is resiliently biased by a spring 76 such that a projecting member 78 is forced away from opening 50. When an individual wishes to move the projecting member 78 such that it is positioned within opening 50 of the first arm 28 and any of the openings 56 on the second arm 30, the user pushes downwardly on the locking cylinder 74, against the force of the spring 76. Once the projecting member 78 is positioned within opening 50 and 56, a key is inserted within the locking cylinder and rotated to lock the locking cylinder 74 at its position within the sleeve 72. This locks the first arm 28 relative to the second arm 30.

The security provided by the locking member 52 is enhanced by the provision of a flange 80 secured to the sleeve 72. The flange 80 accepts bolts 54 to securely mount the locking member 52 on the first arm 28. The provision of the flange 80 prevents thieves from prying the locking member 52 off the first arm 52. While the disclosed locking member 52 utilizes a key for actuation, the locking member could be electronically actuated. For example, the locking member 52 could be controlled via the use of a remote control, which will cause a solenoid to retract or extend a locking pin.

The second bar 34 is shaped to be telescopically received within the recess formed in the U-shaped member 24. The second bar 34 includes a plurality of holes 56 along its length. The holes 56 are positioned such that the locking member 52 selectively engages the openings 56 to lock the second bar 34 relative to the U-shaped bar 24.

Figure 10:
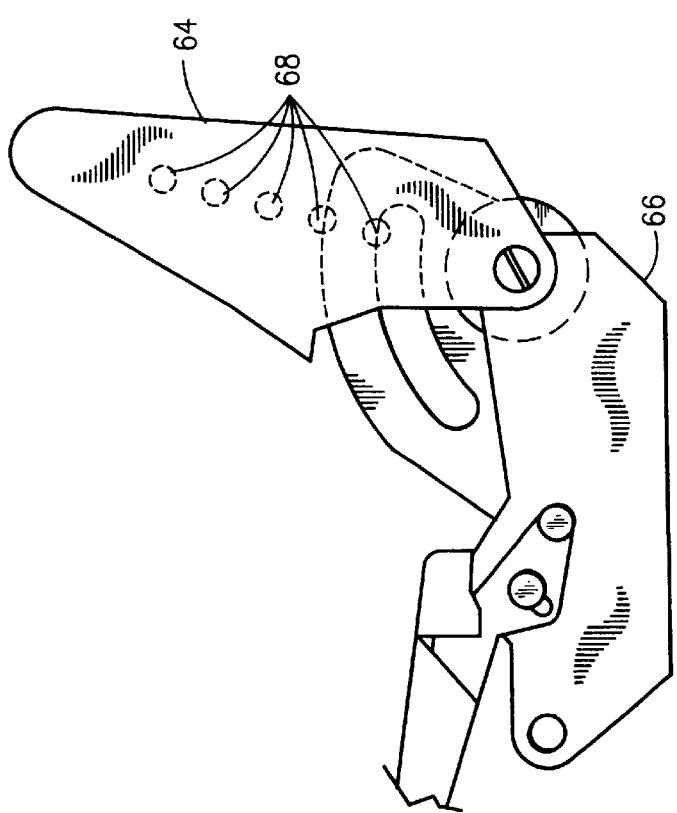
FIG. 10 is a side view showing the internal details of the vehicle seat.
Figure 12:
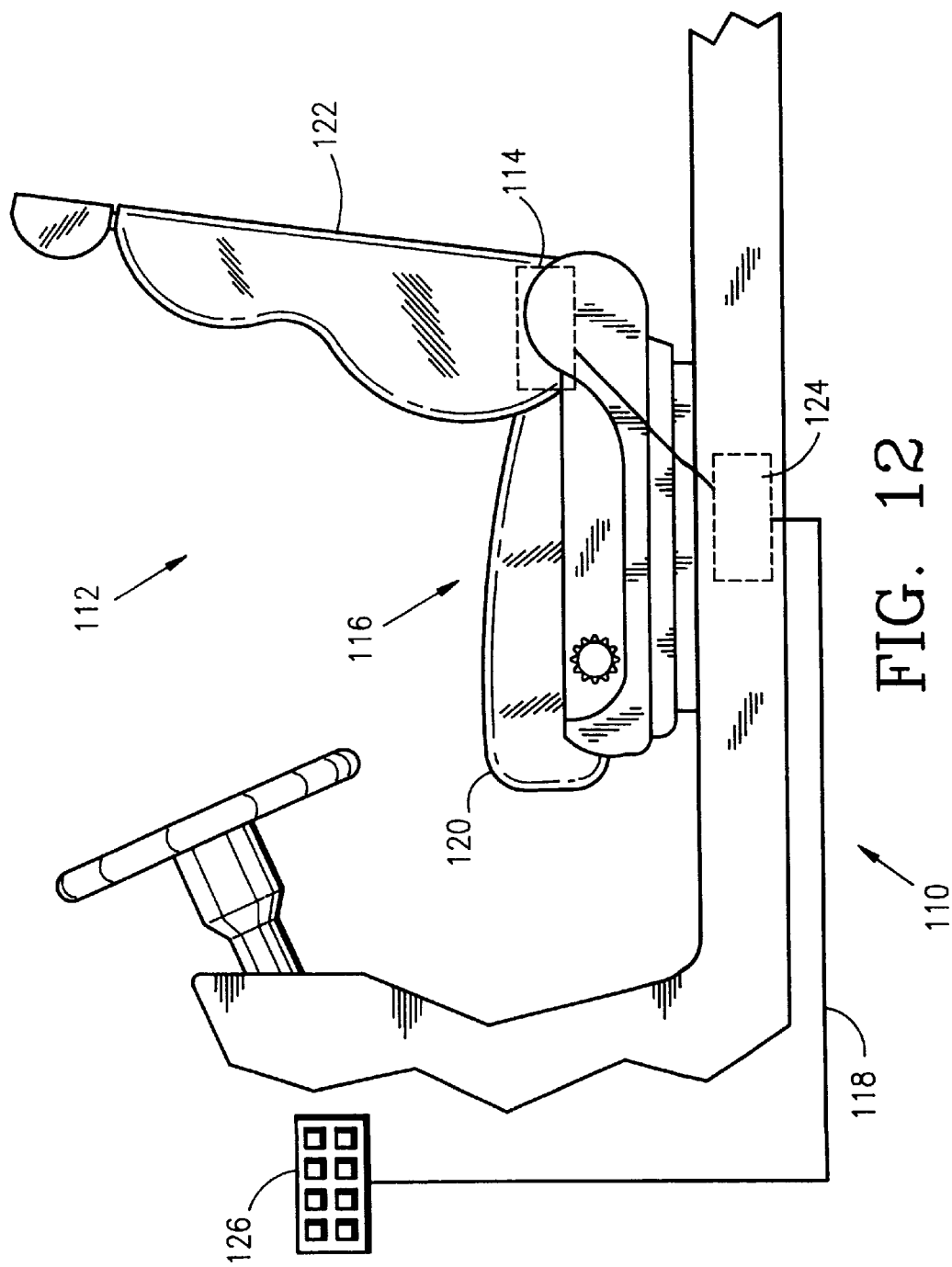
FIG. 12 is a side view of an alternate embodiment of the present theft prevention device employed for use with vehicles having seat patterning systems.

The second bar 34 is also provided with an opening 58 at its first end 60. The opening 58 is shaped to accept a bolt 62 for pivotally securing the first end 60 of the second bar 34 to the lumbar support member 20. Specifically, the second bar 34 is bolted to the lumbar hinge support arm 64, which is shown in FIG. 10. Specifically, vehicle seats 22 are commonly provided with a lumbar hinge support arm 64 pivotally secured to the seat frame member 66. The lumbar hinge support arm 64 includes a plurality of holes 68 to which the first end of the second bar may be bolted. The first end 60 of the second bar 34 is bolted to the lumbar hinge support arm 64 in a manner permitting the second bar 34 to freely pivot relative to the lumbar hinge support arm 34. As shown in FIGS. 2 and 3, a cover 70 is also provided for positioning over the first end 60 of the second bar 34. The cover 70 is made from any durable material, preferably plastic, and is designed to provide a more aesthetically pleasing device by covering the bolt and the first end of the second member.

Figure 4:
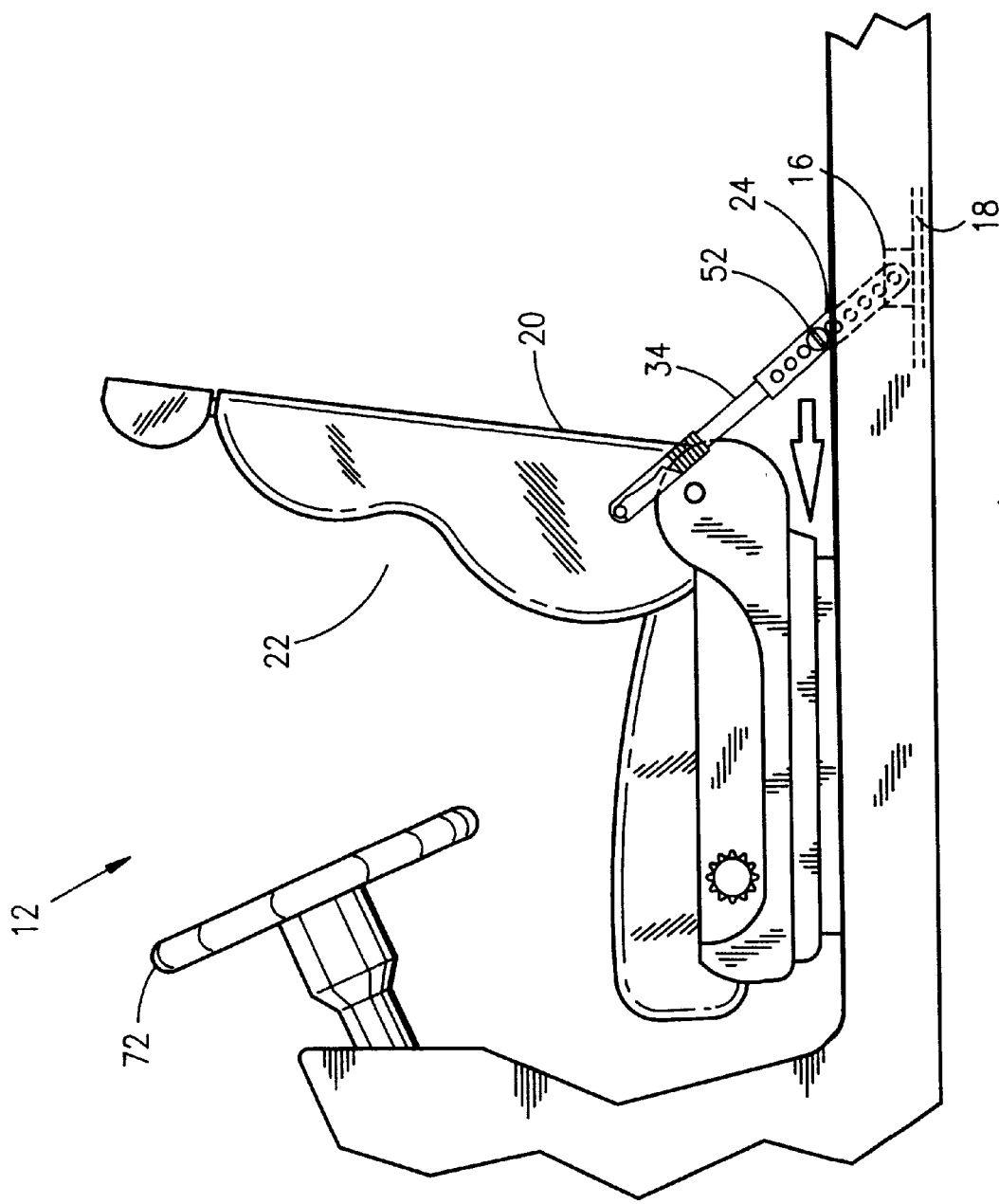
FIG. 4 is a side view of the first embodiment of the present theft prevention device showing the device as the seat moves forward.
Figure 5:
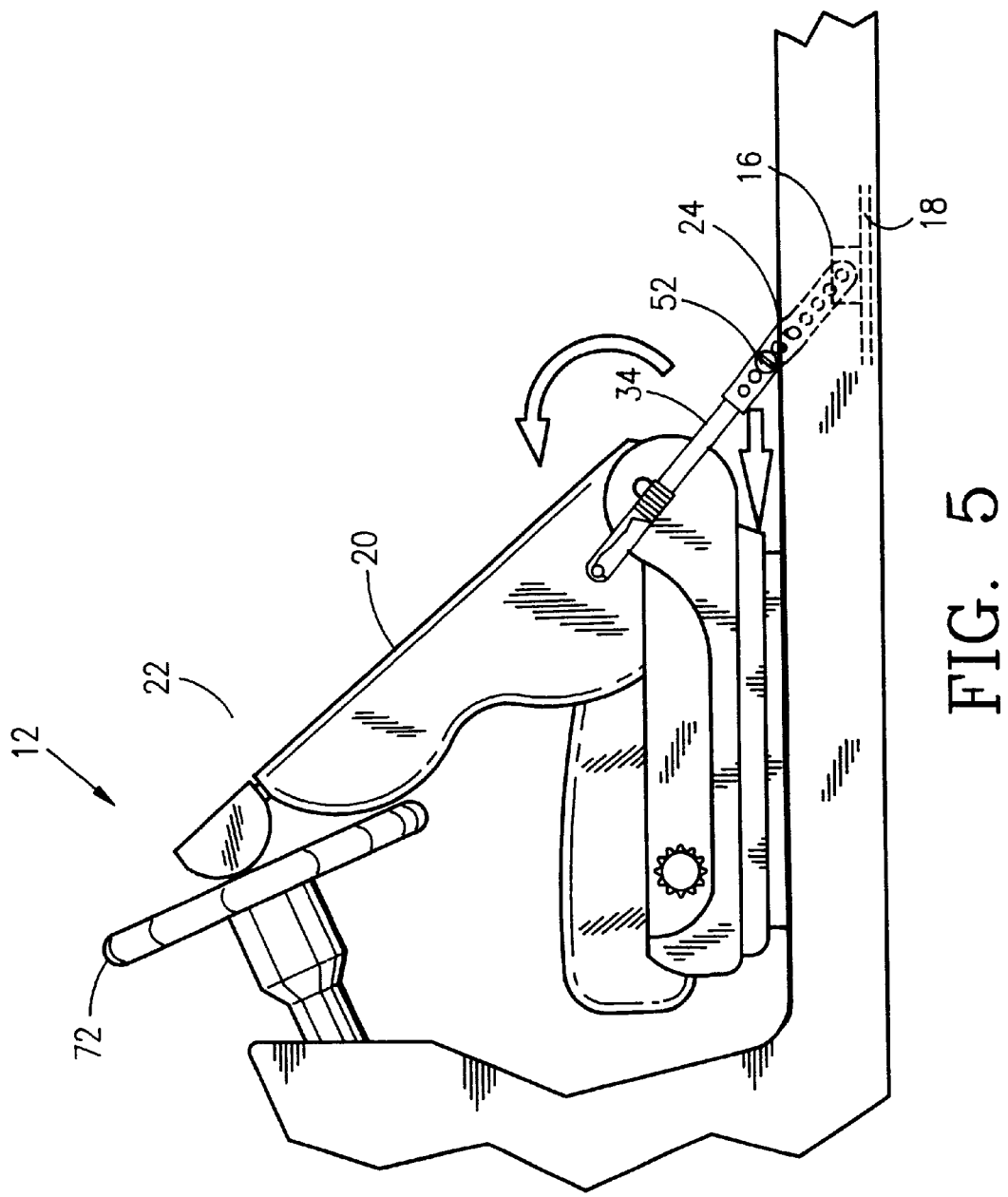
FIG. 5 is a side view of the first embodiment of the present theft prevention device showing the device when the seat and lumbar support are fully moved forward.

Referring to FIGS. 1, 4, and 5, the use of the present theft prevention device 10 is disclosed. In use, the extension member (i.e., the U-shaped bar 24 and the second bar 34) is secured to the pivoting bolt of the vehicle's rocker panel and the lumbar support member in the manner described above. When a vehicle owner wishes to drive the vehicle 12, the seat 22 is positioned in a desirable manner and the locking member 52 is not positioned to engage the second bar 34. After a vehicle owner reaches a desired location and wishes to secure his other vehicle, the seat 22 is moved forward as far as possible. Similarly, the lumbar support member 20 is rotated forward until it contacts the steering wheel 72 (when the driver's seat is secured) or the front instrument panel and dashboard of the passenger compartment (when the front passenger seat is secured). Once the vehicle seat 22 is fully moved forward to limit access to the passenger compartment (see FIG. 5), the locking member 52 is actuated to lock the second bar 34 relative to the U-shaped bar 24. This is accomplished by moving the projection 78 of the locking member 72 within openings 50 and 56 and locking the locking cylinder 76 in its position with the sleeve 72. At this point, the vehicle seat 22 is locked in position and may not be moved until the owner releases the locking member 52 permitting the second bar 34 to move relative to the first U-shaped bar 24.

Figure 6:
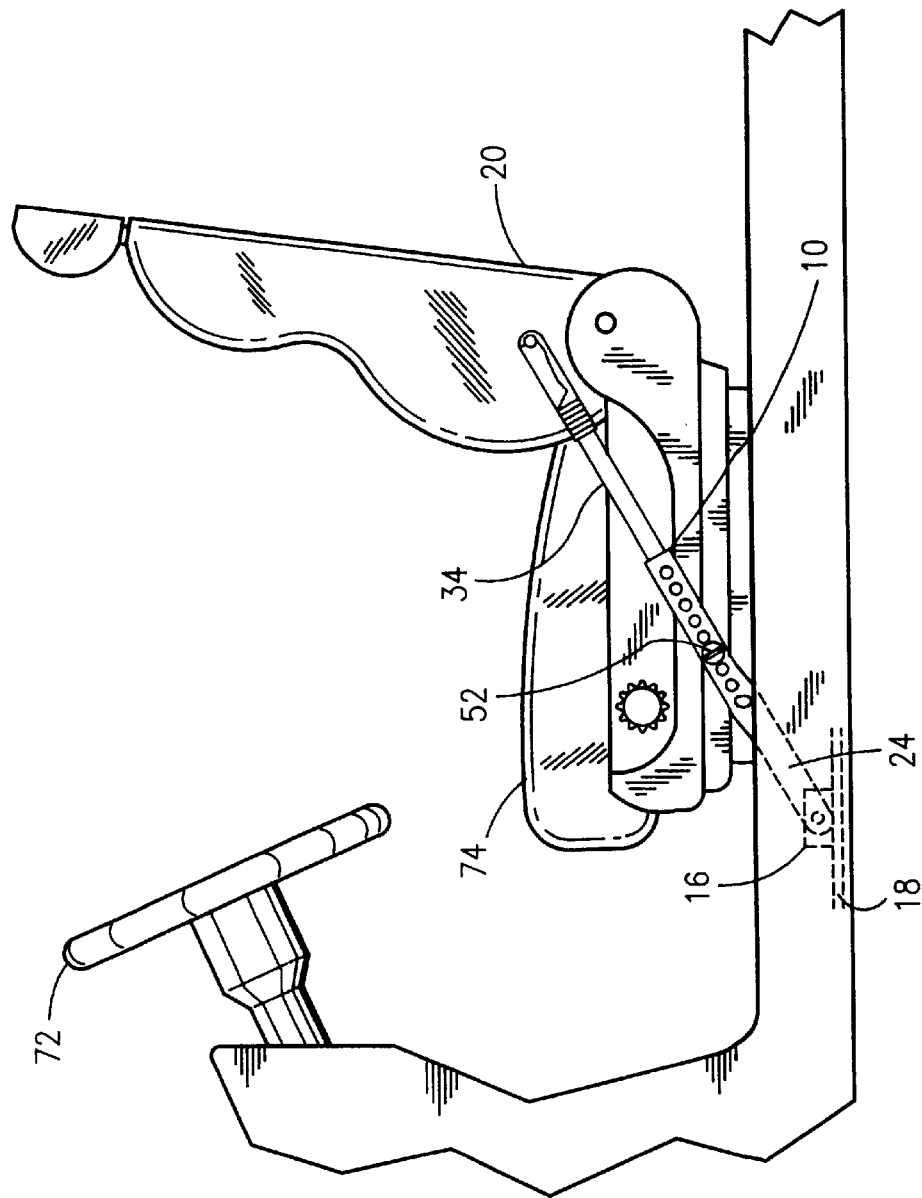
FIG. 6 is a side view of a vehicle seat including a second embodiment of the present theft prevention device attached to the seat.
Figure 7:
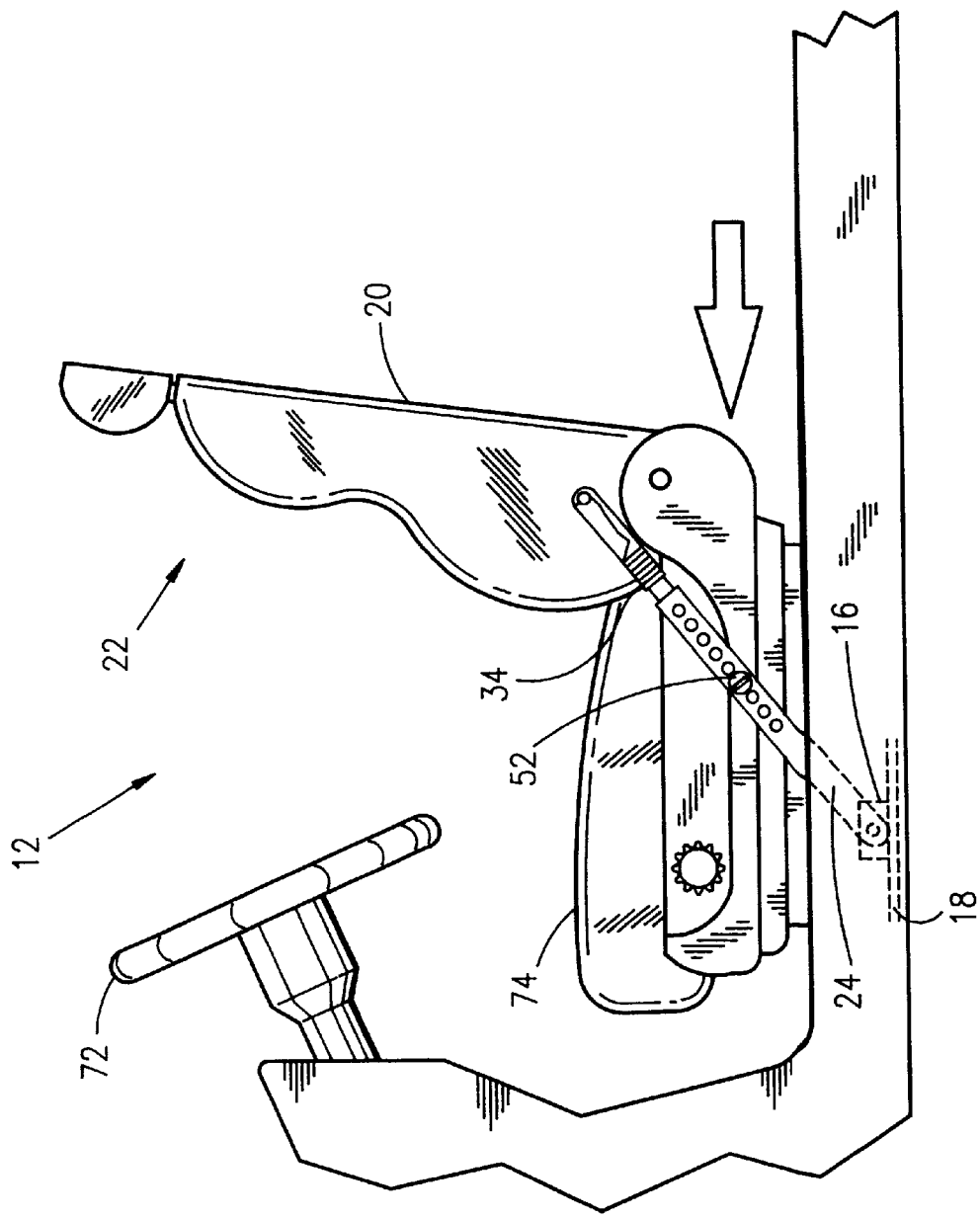
FIG. 7 is a side view of the second embodiment of the present theft prevention device showing the device as the seat moves forward.
Figure 8:
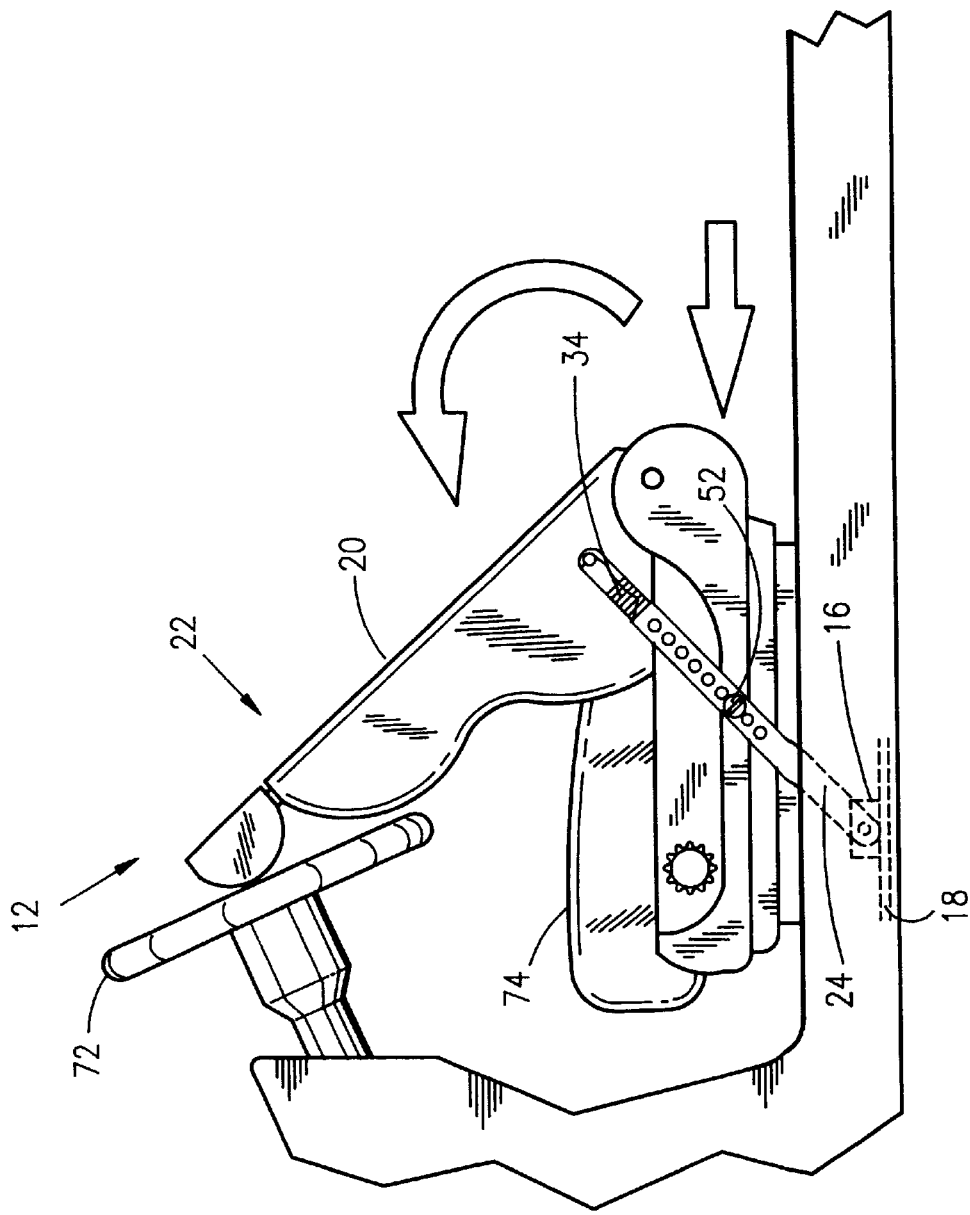
FIG. 8 is a side view of the second embodiment of the present theft prevention device showing the device when the seat and the lumbar support are fully moved forward.

The use of the theft prevention device 10 as disclosed in FIG. 1, 4 and 5 shows the theft prevention device secured behind the vehicle seat 22. As shown in FIGS. 6, 7, and 8, the theft prevention device 10 may be secured such that the device is secured forward of the lumbar support member. Specifically, the device 10 is secured to a pivoting bolt 16 of the rocker panel 18 at a position forward of the seat 22. When the theft prevention device is installed in this manner, the device 10 functions in much the same manner as discussed above, except the extension member is shortened when a vehicle owner desires to securely lock his or her vehicle. Specifically, the second bar 34 is telescopically moved within the first U-shaped member 24 until the lumbar support member 20 and the seat member 74 are moved to their forward positions (see FIGS. 7 and 8). When the vehicle seat 22 is moved forward sufficiently to limit access to the passenger compartment (see FIG. 7), the second bar 34 is locked relative to the U-shaped bar 24 by actuating the locking member 52.

The theft prevention device has been disclosed for use with a manual lumbar support member designed to freely rotate relative to the seat member. However, the present theft prevention device may be used with electronically controlled vehicle seats without departing from the spirit of the present invention. In addition, the disclosed locking member requires manual actuation to lock or unlock the extension member. However, the locking member could be electronically controlled, while remaining within the spirit of the present invention. Further, the locking member could be automatically actuated (as opposed to manually actuated), without departing from the spirit of the present invention.

The theft prevention device has been designed for use with all seat types. For example, the device may be used with bucket seats by attaching a device to the driver seat and the passenger seat. Similarly, when the device is secured to a split bench seat, one device is attached to the passenger side of the seat and another device is attached to the driver side of the seat. If the vehicle includes a full bench seat, a single device may be used.

Use of the theft prevention devices creates an environment that protects a vehicle from theft and deters a thief from attempting to steal the vehicle. Specifically, by locking the seat adjacent the front instrument panel and dashboard of the vehicle, the would-be thief is not able to enter the passenger compartment to drive the vehicle or steal other objects contained within the passenger compartment. That is, the locked seat protects the glove compartment, stereo equipment, steering wheel and air bags. In addition, after entering a car the thief will notice the extension bar locking the seat in a forward position. Hopefully, the thief will then consider the futility of entering the vehicle and move on to another vehicle.

As discussed above, the present theft prevention device may be automatically actuated. Referring to FIGS. 12 to 15, three embodiments of an automatically actuated theft prevention device 110 are disclosed. The theft prevention device 110 is intended for use with vehicles including seat patterning systems 114, and permits a vehicle seat 116 to be moved to a forward position when a driver leaves the vehicle unattended.

Figure 13:
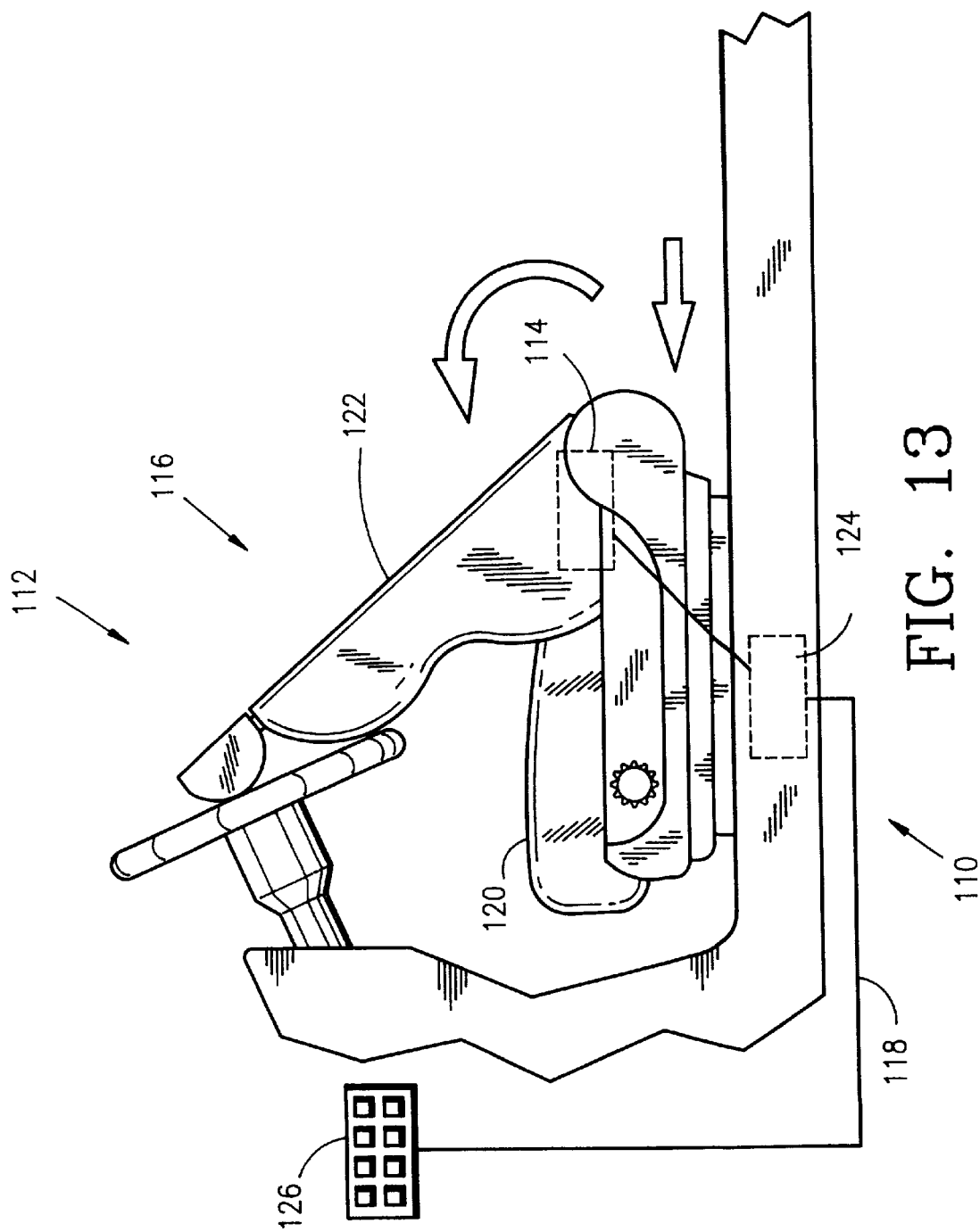
FIG. 13 is a side view of the alternate embodiment disclosed in FIG. 12 showing the device when the seat and lumbar support are fully moved forward.
Figure 14:
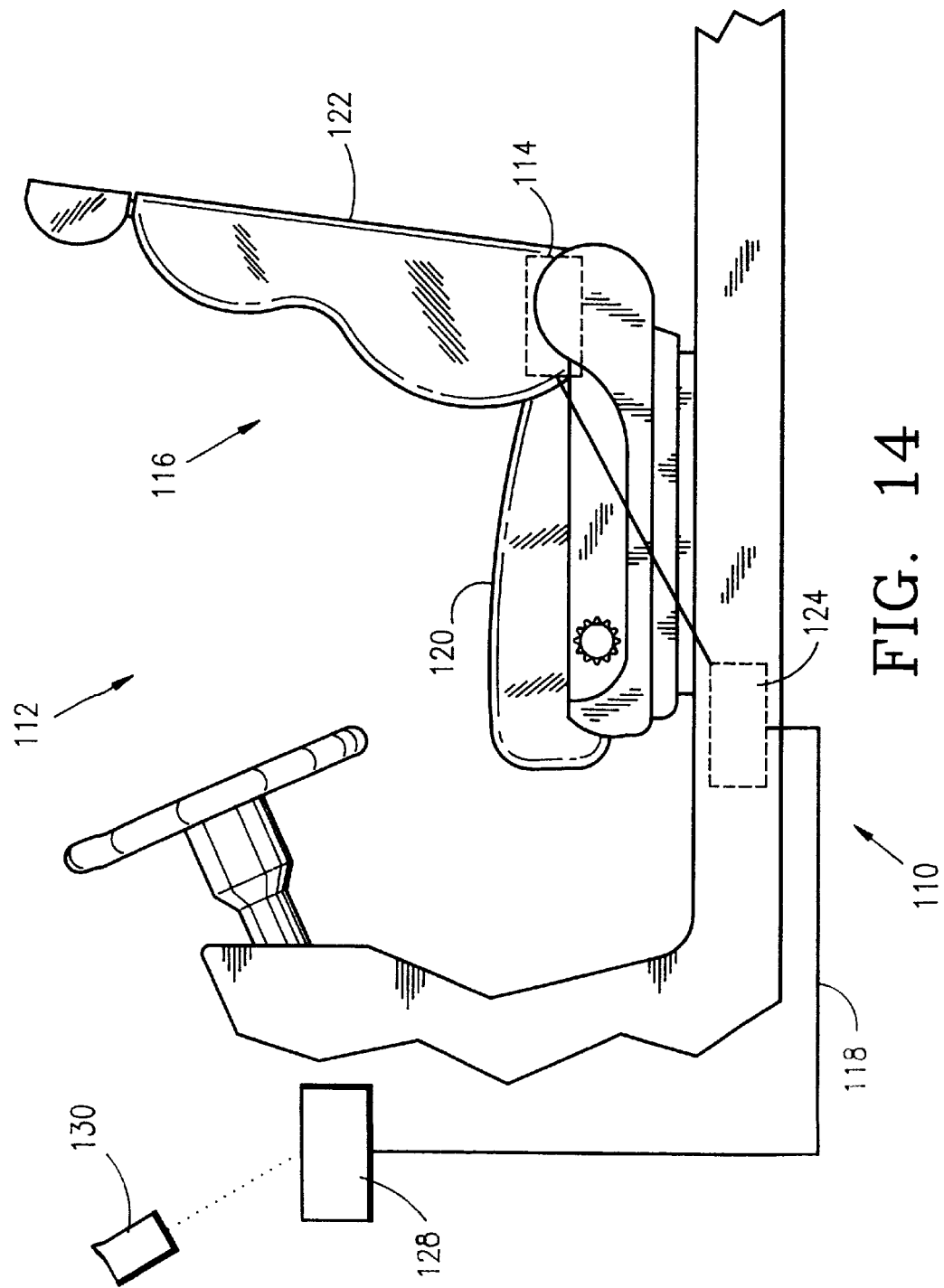
FIG. 14 is a side view of another alternate embodiment of the present theft prevention device employed for use with vehicles having seat patterning systems.
Figure 15:
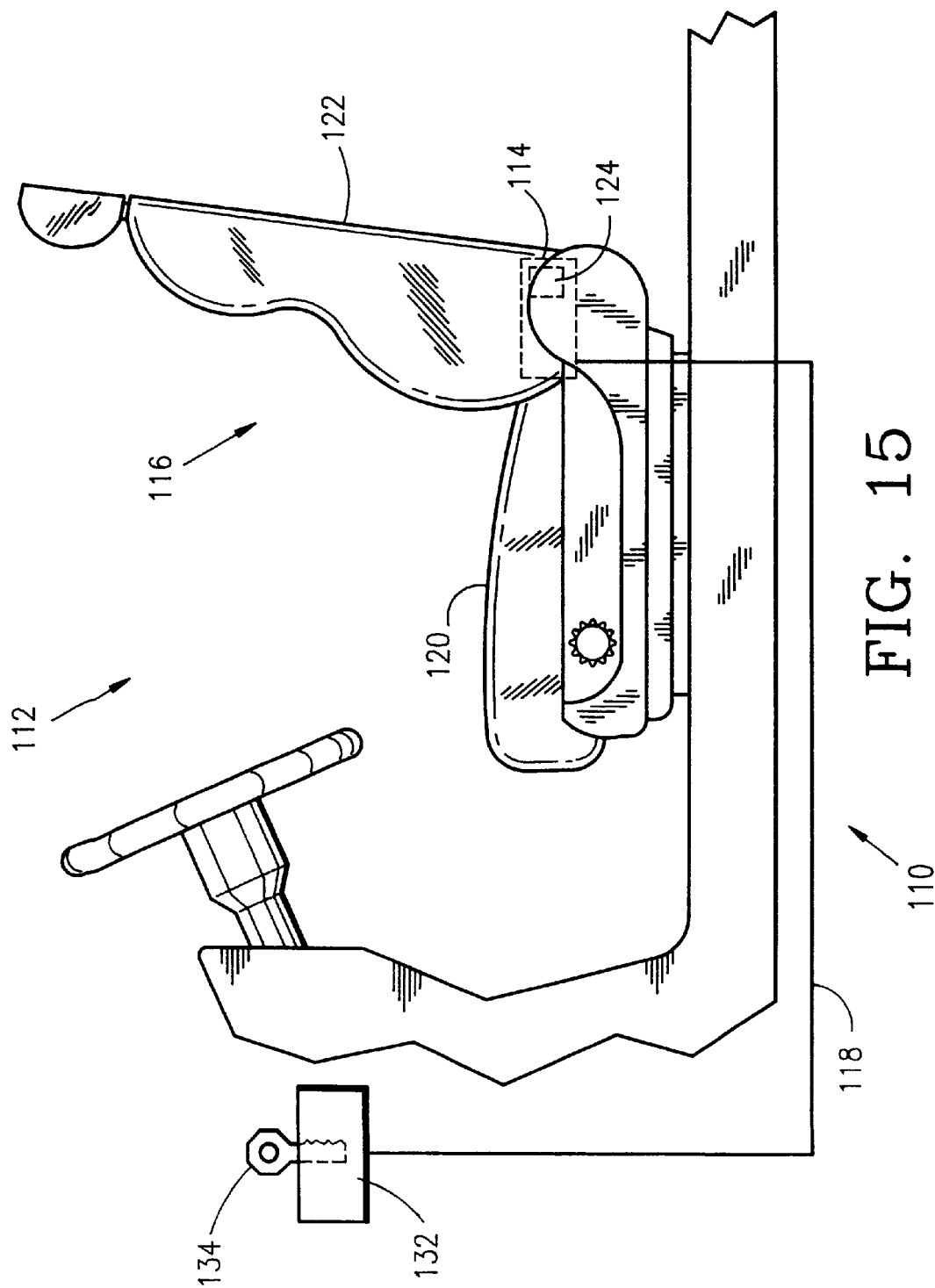
FIG. 15 is a side view of a further alternate embodiment of the present theft prevention device employed for use with vehicles having seat patterning systems.

Specifically, seat patterning systems 114 employed in currently available vehicles 112 allow a vehicle seat 116 to automatically move between predetermined positions when a switch is actuated. The present invention employs a security system 118 which moves the vehicle seat 116 to a forward position; that is, the seat member 120, lumbar support 122 and headrest are moved fully forward as shown in FIG. 13. As discussed above, access to the passenger compartment is substantially limited when the vehicle seat 116 is place in this forward position.

The present security system 118 employs a security controller 124 integrated with the existing seat patterning system 114 of the vehicle 112. Alternately, the security controller 124 may be integrally incorporated in the seat patterning system 114 of a vehicle 112 (see FIG. 15). The security controller 124 is programmed to instruct the seat patterning controller 114 to move the vehicle seat 116 to the forward position shown in FIG. 13, when an actuating switch is triggered by an individual responsible for the vehicle 112.

The actuating switch may be triggered either manually or remotely. As such, the actuating switch may be a switch 126 on the door or the dashboard of the vehicle 112 (see FIGS. 12 and 13) or the actuating switch may simply be a RF receiver 128 which is actuated upon the receipt of a signal from a remote control device 130 (see FIG. 14). If a switch 126 on the door or dashboard is employed as the actuating switch, the switch 126 will include a security coded system (for example, a security coded keypad) such that a would be thief will be unable to actuate the present security controller 124. In addition, the actuating switch may be a key actuated switch 132, which can only be controlled by an individual employing an appropriate key 134.

In use, the individual leaving his or her vehicle triggers the actuating switch when he or she intends to leave the vehicle unprotected for any period of time. When the individual triggers the actuating switch, the security controller sends a signal to the seat patterning system instructing the seat patterning system to move the seat member and lumbar support to the forward positions shown in FIG. 13. When the individual returns to his or her vehicle, the actuating switch is triggered by the owner or user, sending a message to the security controller to instruct the seat patterning system to move the vehicle seat back to its original position. As discussed above, the actuating switch may be controlled by a security coded keypad, a remote control device, or a key.

In a more specific embodiment of the invention, automatic seat control switches normally come with luxury vehicles, and are frequently present in the driver's side door and also in the passenger side door. These seat control switches usually have CPU memory which stores instructions for operating a motor drive to vary the front seat to accommodate different driver or passenger positions. In these luxury automobiles not only the seat position but also the lumbar and neck rest positions may be varied. As a preferred embodiment of this invention, and with reference to FIG. 13, the existing actuating switch 126 which comes with the luxury vehicle, is modified: (1) to add security actuating switch 152 to send a message to the security controller 124 to move vehicle seat 116 and lumbar support 122 to the most forward or security position when the actuating switch 152 is triggered by a owner or user of the vehicle who is legally responsible for the vehicle 112; and (2) to add a power switch 156 key operated by the vehicle owner or user to connect or disconnect, as the case may be, the activating switch to or from the electric power circuit of the vehicle.

Before the owner or user of the vehicle locks the door, he inserts key 154 into power switch 156 and turns the key thereby connecting the activating switch to the vehicle electric power circuit. Upon the owner or user's input to the activating switch, the seat moves forward along existing rails 150 and the lumbar support rotates forward, both coming to rest as shown in FIG. 13 in the most forward or security position. When the key is withdrawn from the power switch, the activating switch is disconnected from the vehicle power supply. In this position, a potential thief upon breaking into the vehicle has no room to manipulate the wheel or the gas and brake pedals and therefore is unable to drive the vehicle away. When the owner or user of the vehicle returns, he simply activates the seat by: (1) inserting the key into the power switch and turning it thereby reconnecting the activating switch to the electric power supply of the vehicle; and (2) inputting a signal through the actuating switch to the security controller, thereby returning the vehicle seat, lumbar and neck rest to their normal positions.

It is emphasized again that once the seat, lumbar and headrest arrive at the most forward security position, the activating switch 152 is disconnected from the vehicle electric power circuit thereby preventing a would-be thief from using the activating switch 152 and moving the seat back to its original position.

It is noted that the rails are those which come with the existing vehicle as manufactured and do not require any retrofitting.

This system is a substantial improvement over the Cohen Patent teachings which disclose movement of the seat to its security position only when a would-be thief breaks into the vehicle. Unfortunately, the thief may have sufficient time, as the seat begins its forward movement, to jam a wedge between the seat rollers and the rail guides thereby preventing forward movement of the seat and allowing the thief to start the vehicle engine and drive the vehicle away. In the instant case, the user or owner of the vehicle initiates and completes the seat movement sequence prior to locking the doors of the vehicle thereby preventing a thief from interfering with the movement phase of the seat patterning system.

While the power switch is shown as key operated, in this embodiment, other input systems well known in the art can also be used; for example, a security code pad and a receiver triggered remote control.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A theft prevention device for vehicles employing a seat patterning system to automatically control the position of a vehicle seat movably situated on existing parallel guide rails to enable the seat to move forwardly or rearwardly, wherein the vehicle seat includes a seat member and a lumbar support member, which move independent of one another, the theft prevention device comprising:

a security controller adapted for integration with the seat patterning system such that the security controller instructs the seat patterning system to move the seat between an original portion and a forward security position with the seat member and lumbar support moved forward to prevent a thief from accessing the passenger compartment of the vehicle; and an activating switch which can only be controlled by the owner or user of the vehicle, communicating with the security controller to send the security controller a message when activated by the owner or user of the vehicle, to instruct the seat patterning system to selectively move the vehicle seat along the existing guide rails and rotate the lumbar support member from their original positions to forward security positions, whereby when the seat and lumbar support members are in the forward security position, the activating switch is disconnected from the vehicle electric power system circuit thereby preventing a thief from activating the activating switch during a break in of the vehicle, said activating switch containing a power switch which upon input from the owner or user of the vehicle, connects or disconnects the activating switch from the vehicle electric power system circuit and wherein the said activating switch comprises a first portion comprising memory buttons to move the seat forwardly or rearwardly, and a second portion which when activated by the owner or user, instructs the security controller to send a message to the seat patterning system to move the seat to the forward security position.

2. The power switch of claim 1 which is key operated.

3. The power switch of claim 1 which comprises a receiver triggered by a remote control.

4. The activating switch of claim 1 selected from the group consisting of a security button or switch, a security code key pad, a receiver triggered by a remote control and a key switch.

5. The activating switch of claim 1 in which the second portion comprises a memory button and a key operated power switch, which when activated by the user, connects the activating switch to the vehicle electric power system circuit permitting movement of the seat and lumbar members, and when placed in the locked configuration by the user, disconnects the activating switch from the vehicle electric power system circuit.

6. A vehicle provided with a theft prevention device comprising:

a seat patterning system to automatically control the position of a vehicle seat movably situated on existing parallel guide rails to enable the seat to move forwardly or rearwardly, wherein the vehicle seat includes a seat member and a lumbar support member, which move independent of one another, the theft prevention device comprising:

a security controller adapted for integration with the seat patterning system such that the security controller instructs the seat patterning system to move the seat between an original portion and a forward security position with the seat member and lumbar support moved forward to prevent a thief from accessing the passenger compartment of the vehicle; and an activating switch which can only be controlled by the owner or user of the vehicle, communicating with the security controller to send the security controller a message when activated by the owner or user of the vehicle, to instruct the seat patterning system to selectively move the vehicle seat along the existing guide rails and rotate the lumbar support member from their original positions to forward security positions, whereby when the seat and lumbar support members are in the forward security position, the activating switch is disconnected from the vehicle electric power system circuit thereby preventing a thief from activating the activating switch during a break in of the vehicle, said activating switch containing a power switch which upon input from the owner or user of the vehicle connects or disconnects the activating switch from the vehicle electric power system circuit and wherein the said activating switch comprises a first portion comprising memory buttons to move the seat forwardly or rearwardly, and a second portion which when activated by the owner or user, instructs the security controller to send a message to the seat patterning system to move the seat to the forward security position.

7. The power switch of claim 6 which is key operated.

8. The power switch of claim 6 which comprises a receiver triggered by a remote control.

9. The activating switch of claim 6 selected from the group consisting of a security button or switch, a security code key pad, a receiver triggered by a remote control and a key switch.

10. The activating switch of claim 6 in which the second portion comprises a memory button and a key operated power switch, which when activated by the user, connects the activating switch to the vehicle electric power system circuit permitting movement of the seat and lumbar members, and when placed in the locked configuration by the user, disconnect, the activating switch from the vehicle electric power system circuit.

* * * * *